(12) United States Patent
Meng

(10) Patent No.: US 6,697,375 B1
(45) Date of Patent: Feb. 24, 2004

(54) METHOD AND APPARATUS FOR BANDWIDTH AND FREQUENCY MANAGEMENT IN THE U-NII BAND

(75) Inventor: Teresa H. Meng, Portola Valley, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 0 days.

(21) Appl. No.: 09/368,637

(22) Filed: Aug. 4, 1999

(51) Int. Cl.[7] .............................. H04J 3/16; H04Q 7/00
(52) U.S. Cl. ..................................... 370/465; 455/452.1
(58) Field of Search ................................. 370/318, 465, 370/468, 252, 253, 315, 328, 332, 333; 455/522, 69, 63, 452.1, 452.2, 456.1, 63.1

(56) References Cited

U.S. PATENT DOCUMENTS

| | | | | |
|---|---|---|---|---|
| 5,224,120 A | * | 6/1993 | Schilling | 370/200 |
| 5,619,492 A | * | 4/1997 | Press et al. | 370/441 |
| 5,734,646 A | * | 3/1998 | I et al. | 370/468 |
| 5,825,761 A | | 10/1998 | Tanaka et al. | 370/333 |
| 5,923,650 A | * | 7/1999 | Chen et al. | 370/468 |
| 5,960,003 A | * | 9/1999 | Fischer et al. | 370/468 |
| 6,075,815 A | * | 6/2000 | Chheda et al. | 375/227 |
| 6,088,592 A | * | 7/2000 | Doner et al. | 455/11.1 |
| 6,091,967 A | * | 7/2000 | Kruys et al. | 455/557 |

OTHER PUBLICATIONS

Wireless Local Area Networks, IEEE Communications Magazine (1997) pp. 116–126.

* cited by examiner

Primary Examiner—Min Jung
Assistant Examiner—Andy Lee
(74) Attorney, Agent, or Firm—Rosenberg, Klein & Lee

(57) ABSTRACT

The present invention provides an apparatus and method for optimizing power in order to increase capacity. Rather than having any terminal device limited to a specific maximum data rate, instead the terminal device data rate is limited by the power being used, such that the data rate can vary according to the distance that the terminal device is from the intended receiver.

92 Claims, 11 Drawing Sheets

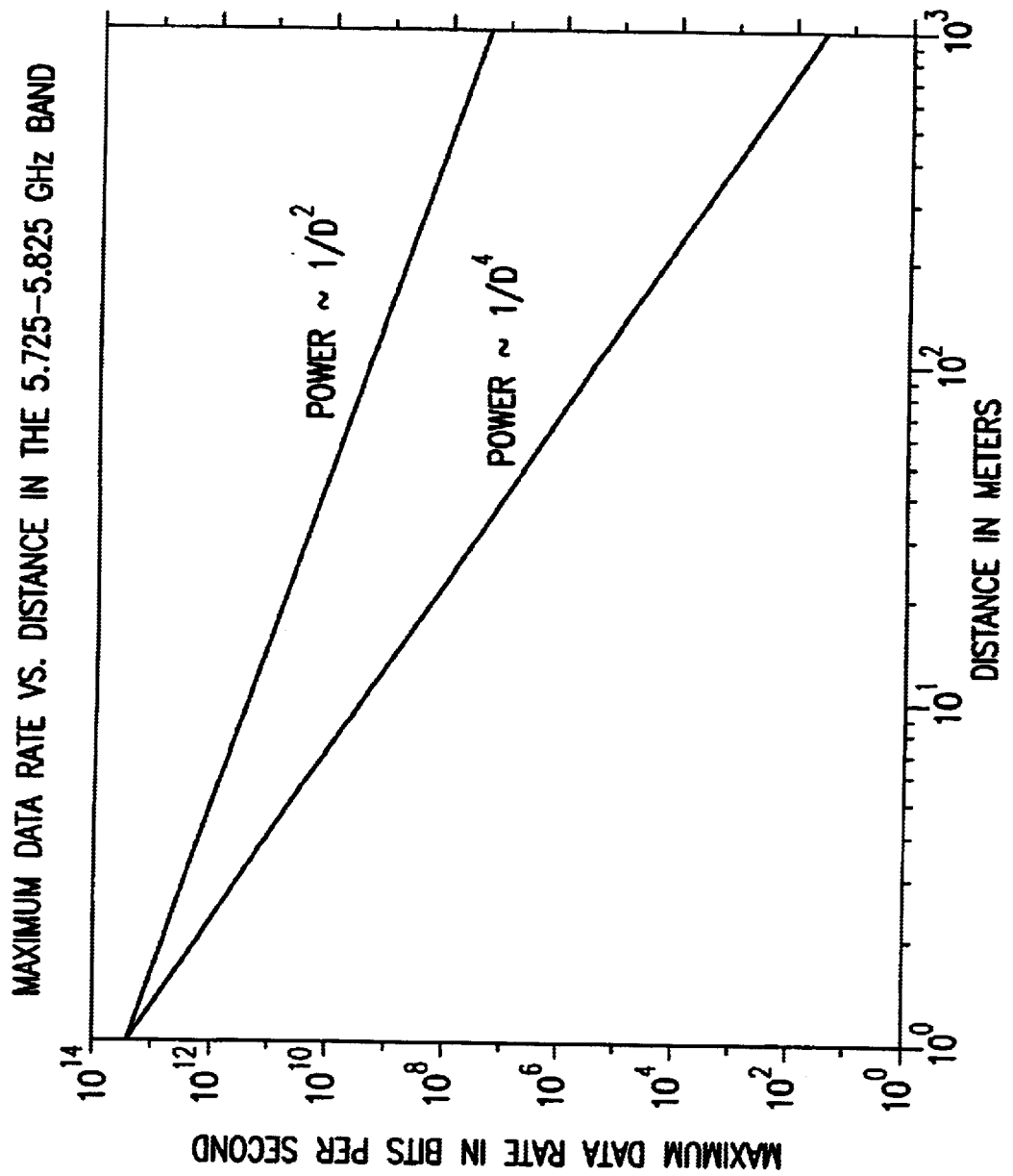

METHOD AND APPARATUS FOR BANDWIDTH AND FREQUENCY MANAGEMENT IN THE U-NII BAND

FIELD OF THE INVENTION

The present invention relates to a method and apparatus for wireless communications having varying data rates, and more particularly to a method and apparatus for wireless communications having varying data rates using U-NII compliant devices.

BACKGROUND OF THE RELATED ART

Conventional digital communications systems, such as systems that practice the IS-95 communication standard, transmit communication signals between a base station and handset receivers. In such systems, many different base stations are located in geographically diverse locations. Each base station therefore covers a portion of the overall area in which communications can occur. In order to increase overall capacity, the area covered by a single base station, typically known as a cell, will have reduced size, or different cells will overlap.

In operation, conventional systems transmit communications signals from the base station to the terminal device using certain communication bands, collectively known as either the downlink or the forward link. Also such conventional systems transmit communications signals from the terminal device to the base station using other communication bands, collectively known as the uplink or reverse link. In such systems, recovery of communications on the reverse link is more difficult than recovery of communications on the forward link, since communications from many different terminal devices must be simultaneously detected from a single received signal at a base station.

To help assist with the simultaneous detection of signals from different terminal devices on the reverse link, such conventional digital communications systems use power control in order to reduce interference for terminal devices that are at different distances within a particular cell. IS-95 describes a particular power control scheme, which effectively maintains the power of multiple terminal devices at different distances at levels such that each terminal device can communicate without interference from other terminal devices predominating. Accordingly, with such a power control scheme, higher transmit power is used for longer range.

Another type of digital communication system is of the type described in the 802.11 Wireless LAN standard. With this standard, there are two ISM bands intended for communications, 902–928 MHz and 2.4–2.48 GHz, and each band has different maximum transmit power levels associated with it. As originally envisioned, digital communication systems that implement this standard use a carrier-sensing multiple access scheme, such that there can be only one device transmitting at a time. The different maximum transmit power levels associated with each band are used to accommodate different ranging requirements.

While these systems have allowed digital communications to evolve, they have their drawbacks. One such drawback is that the data rate for each terminal device is maintained at some nominal rate, regardless and independent of the power being used.

Recently the FCC allocated three bands in the 5 GHz range, the U-NII bands 5.15–5.25 GHz, 5.25–5.35 GHz, and 5.725–5.825 GHz, for general use in wireless communication. More effective use of bandwidth for devices operating in these bands would allow for more efficient communications. Specifically, rather than specifying a certain maximum data rate for all devices, it would be desirable to have variable data rates for different devices operating within these bands, such that all of the devices need not have a maximum data rate, but could use various amounts of the overall bandwidth, depending upon the power that each device was using. Thus, in contrast to conventional digital communications systems that do not allow for any trade-offs to occur between capacity and distance, it would be desirable to have a system that allows for increases in capacity if each terminal device were operating closer to the intended receiver, and thereby using less power.

SUMMARY OF THE INVENTION

Accordingly, it is an objective of the present invention to provide a communication system operating in the 5.15–5.25 GHz, 5.25–5.35 GHz, and 5.725–5.825 GHz bands that allows for tradeoffs to occur between capacity and distance.

It is another objective of the present invention to provide a communication system operating in the 5.15–5.25 GHz, 5.25–5.35 GHz, and 5.725–5.825 GHz bands that allows for an increase in capacity when receivers are operating closer to transmitters, and thereby using less power.

In order to attain the above objectives of the present invention, among others, the present invention provides an apparatus and method for optimizing power in order to increase capacity. Rather than having any terminal device limited to a specific maximum data rate, instead the terminal device data rate is limited by the power being used, such that the data rate can vary according to the distance that the terminal device is from the intended receiver.

BRIEF DESCRIPTION OF THE DRAWINGS

The above and other objectives, features, and advantages of the present invention are further described in the detailed description which follows, with reference to the drawings by way of non-limiting exemplary embodiments of the present invention, wherein like reference numerals represent similar parts of the present invention throughout several views and wherein:

FIGS. 2A–2C illustrates graphs of the maximum data rate for different distances for each of the different U-NII bands;

DETAILED DESCRIPTION OF THE PREFERRED EMBODIMENTS

U-NII devices communicate on three different frequency bands. Devices which communicate on the 5.15–5.25 GHz band can transmit a maximum of 50 mW transmit power per device, plus a 6 dBi antenna gain. Devices which communicate on the 5.25–5.35 GHz band can transmit a maximum of 250 mw transmit power per device, plus a 6 dBi antenna gain. Devices which communicate on the 5.725–5.825 GHz band can transmit a maximum of 1 w transmit power per device, plus a 23 dBi antenna gain.

As mentioned previously, U-NII devices were originally envisioned to operate on these different bands to accommodate various ranging requirements. The present invention, however, teaches a much more advantageous use of the bandwidth available for such devices. In particular, as described hereinafter, the present invention has particular advantages when used in wireless devices not intended for substantial movement, in contrast to wireless devices that are intended to move at rates of automobile speeds.

Figure 1A:
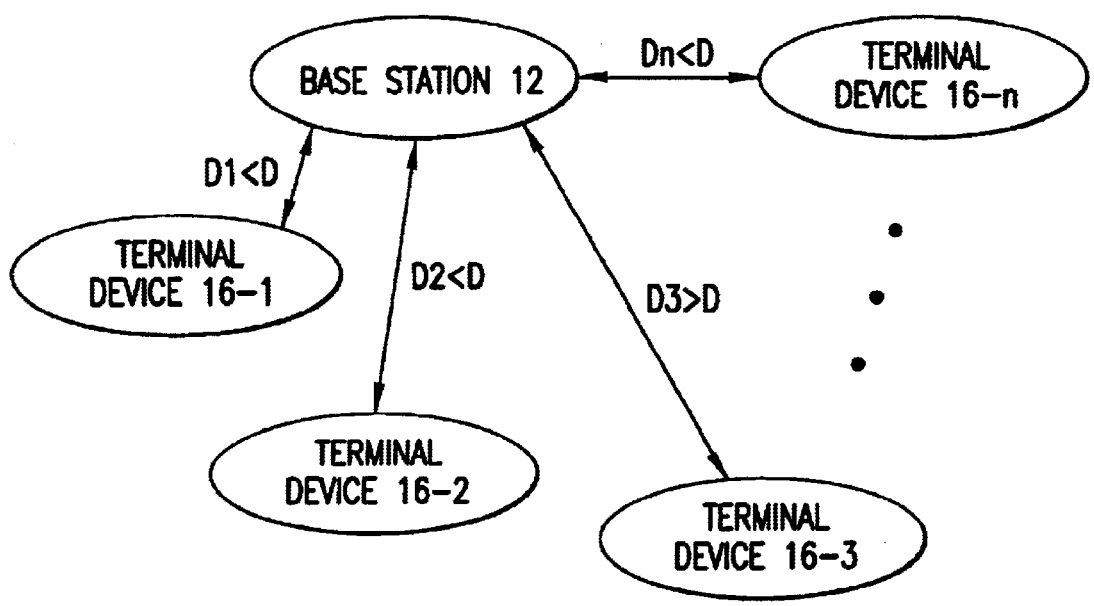
FIGS. 1A–1D illustrate a communication system according to the present invention.

FIG. 1A illustrates an overview of the present invention. As illustrated, the system 10 includes a base station 12 that communicates with many different terminal devices 16. Using one of the U-NII channels, each terminal device 16 receives downlink communications from the base station 12. Using another of the U-NII channels, the terminal device 16 transmits uplink communications to the base station 12. In the preferred embodiment, the downlink communication channel will be at a higher frequency than the uplink communication channel, although it will be appreciated that systems can be designed where this need not be the case. Accordingly, for a terminal device 16 and a base station 12 that are within a distance D from each other, as shown in FIG. 1A, the two different bands can be used such that one of the uplink and downlink (preferably the downlink as described above) will have much greater capacity, due to there being more available power on that band. For example, in the 5.25–5.35 GHz band, five times the transmit power as in the 5.15–5.25 GHz band is allowed. This extra allowance in transmit power can be used to increase the aggregate bandwidth five fold for downlink transmissions as compared to uplink transmissions, if the terminal device 16 is using the 5.15–5.25 GHz band for uplink transmissions and the 5.25–5.35 GHz band for downlink transmissions.

The distance D is determined as that distance within which both the uplink and the downlink communications can take place and reliably transmit data. As will be appreciated, at some distance greater than D, in order to transmit the same amount of data, higher power would be necessary for at least one of the uplink or downlink. Since, however, the U-NII devices are limited by the amount of power that they can transmit, greater power cannot be used for the devices to comply with the U-NII regulations. This invention trades off data rate for lower transmit power, so that if a terminal device 16-3 is farther away from the base station, a lower rate communication link can be setup without violating the U-NII regulations.

It will be appreciated that the present invention has particular advantages in environments in which the base station 12 and terminal devices do not move at high speeds, but rather at "human speed", which is approximately 1 meter per second. Since the average packet length in modern wireless communication systems is fairly short, on the order of a few milliseconds, the distance traveled during one packet interval is on the order of a few millimeters, sufficiently smaller compared to the average distance between a base-station and a terminal device. This allows, therefore, initialization of communications of a given terminal device 16 with the base station 12 such that calculation of the power being used can be performed, with the knowledge that communications thereafter can continue to occur up to a maximum data rate associated with the distance between the base station and a terminal device and the maximum power of each channel being used.

Figure 1B:
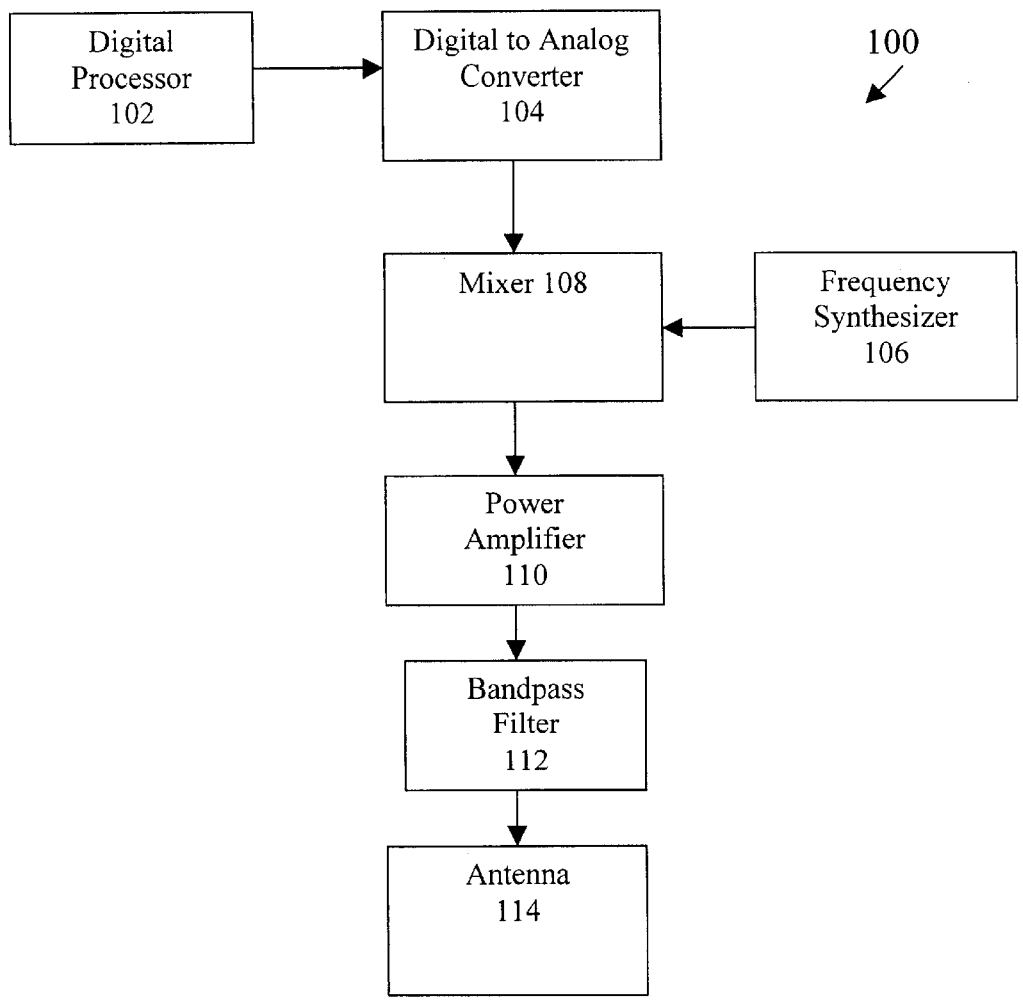
Figure 1C:
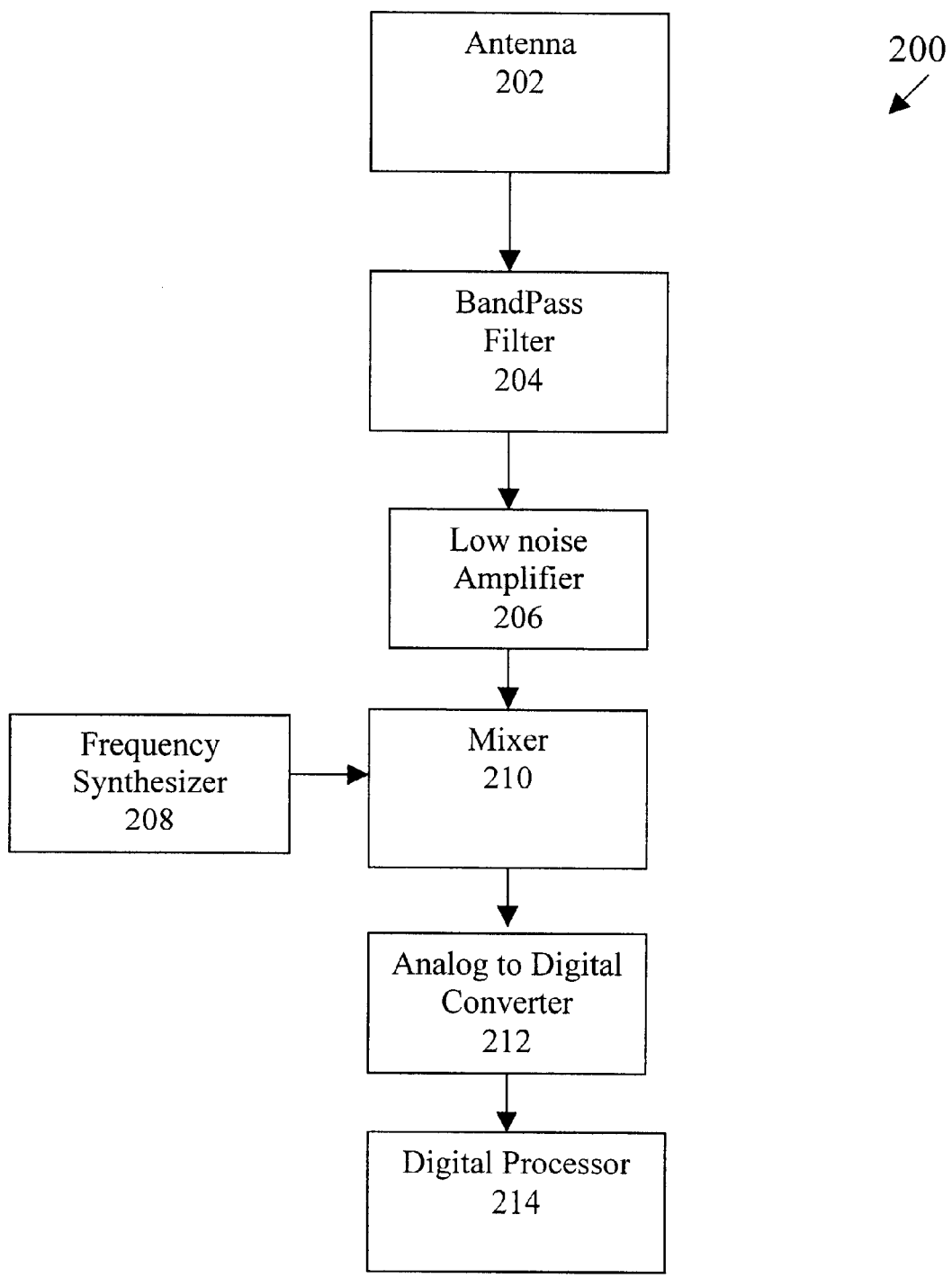

The components used to make each base station 12 and terminal device 16 illustrated as transmitter 100 in FIG. 1B and receiver 200 in FIG. 1C. It will be apparent that each base station 12 and a terminal device 16 will typically include both of a transmitter 100 and a receiver 200. It will be understood that certain of the same components can be used in both the transmitter and receiver. For ease of understanding, however, they are separately labeled and discussed herein.

The transmitter 100 includes a digital processor 102 for digital data processing. A digital to analog converter 104 converts the digital data from the digital processor to an analog format. A frequency synthesizer 106 generates the appropriate carrier frequency. A mixer 108 for frequency up-conversion combines the carrier frequency from the frequency synthesizer 106 with the analog data output from the digital to analog converter 104 to obtain a radio frequency transmission signal. A power amplifier 110 performs signal amplification on the transmission signal. The transmission signal is then bandpass filtered with a bandpass filter 112 and finally transmitted using the antenna 114.

The receiver 200 includes a receive antenna 202 that receives the transmission signal, which is then bandpass filtered using bandpass filter 204. A low-noise-amplifier 206 then amplifies the relatively small received radio-frequency transmission signal. A frequency synthesizer 208 generates the appropriate carrier frequency for down-conversion. A mixer 210 receives the carrier frequency from the frequency synthesizer and the amplified radio-frequency transmission signal and performs down-conversion to obtain an analog signal representative of the originally transmitted signal. An analog to digital converter 212 converts the analog signal to a corresponding digital signal, and a digital processor 214 processes the received digital signal.

The components discussed above are conventional components and no further discussion of them is believed necessary. For example, multiple antennas can be used by the base station 12 or the terminal devices 16 in order to achieve spatial diversity, for the purpose of increased capacity and robustness.

Figure 2A:
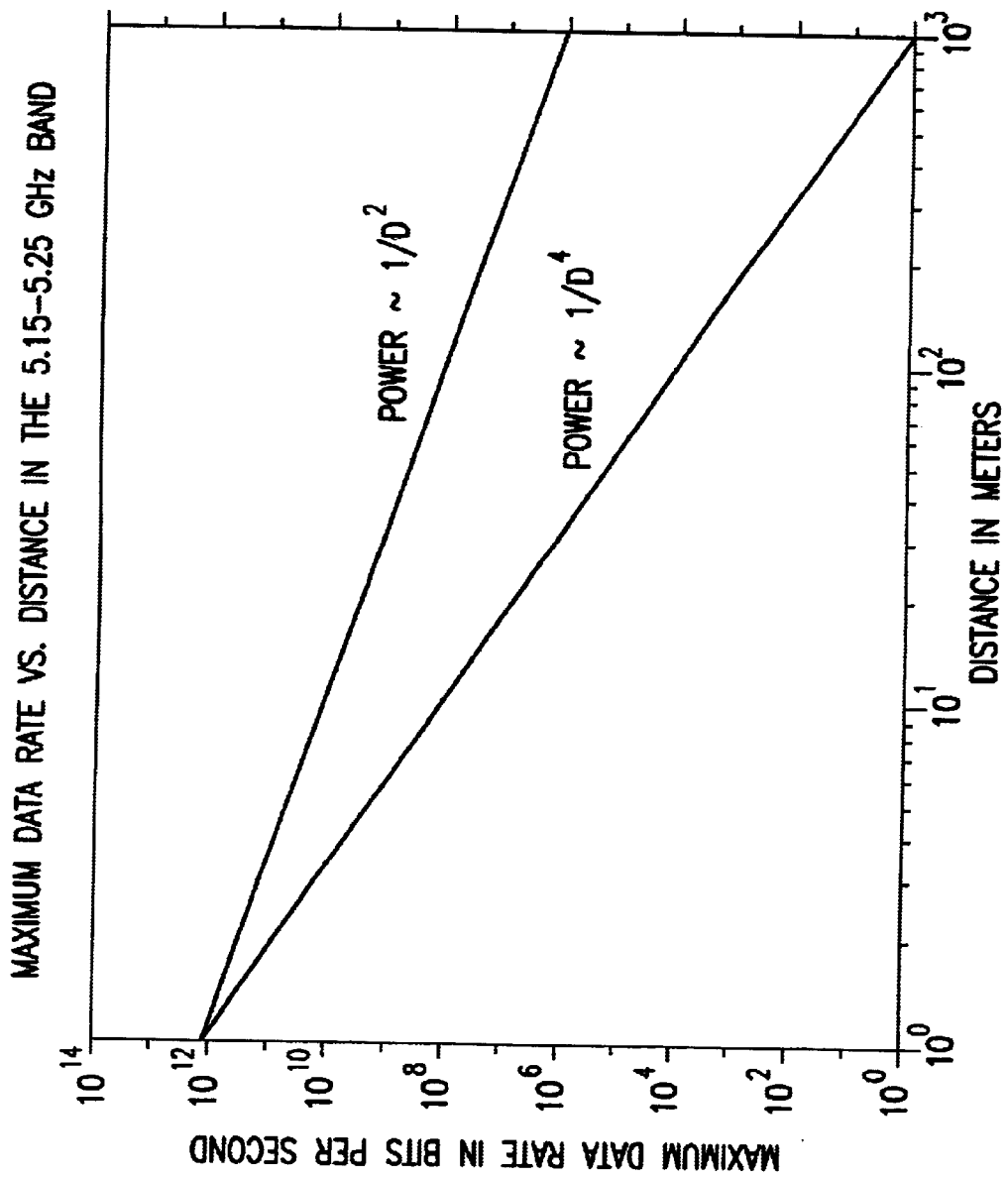
Figure 2B:
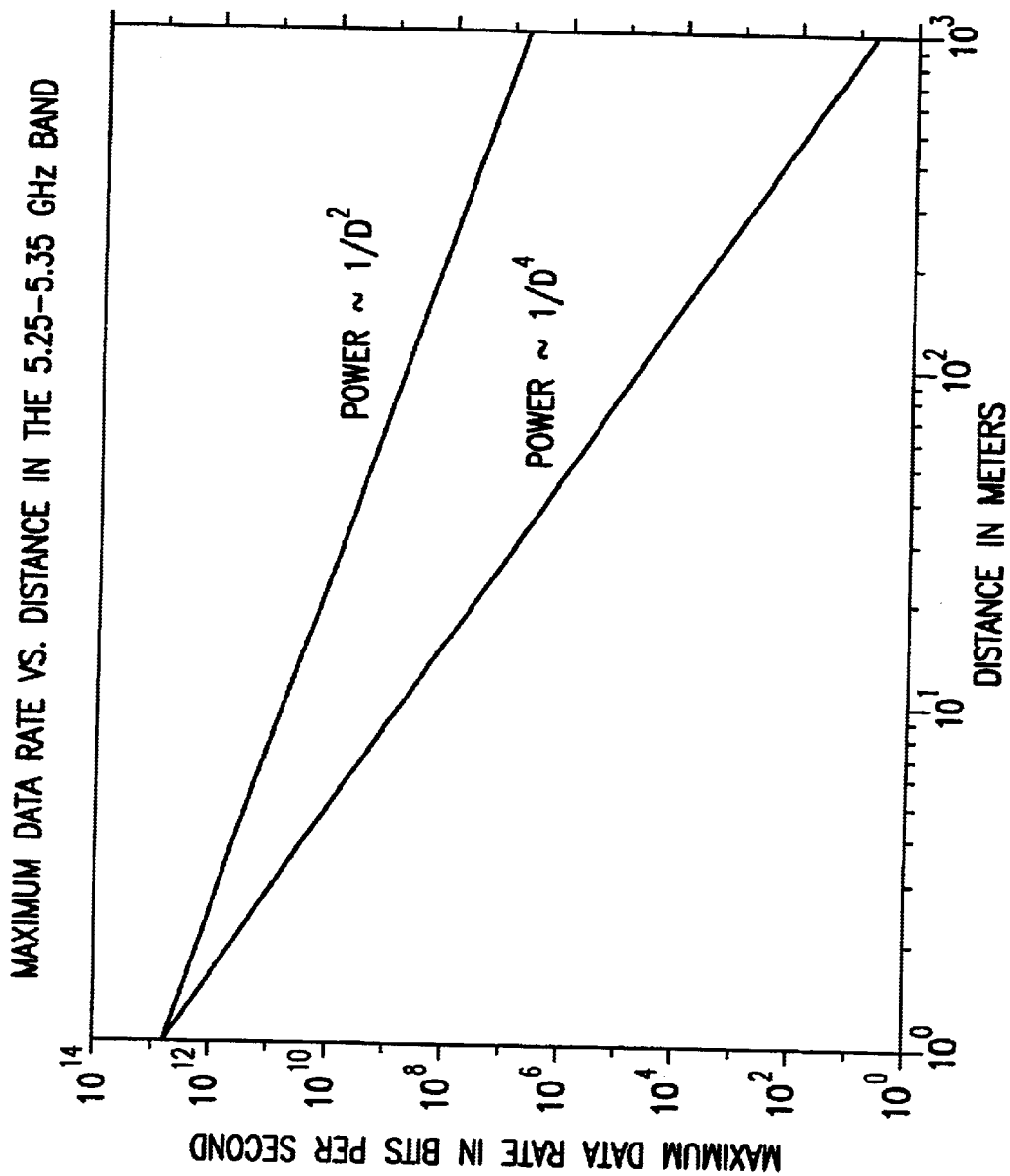

Since, however, operations performed by the present invention in order to dynamically allocate data rate are not conventionally performed, a further description of these operations will be provided. Specifically, according to the present invention, the rate of data transmission between a specific base station 12 and a specific terminal device 16 are dynamically determined in the digital domain using the digital processor 102, through either code-division multiple access or other data modulation schemes. The actual data rate to each terminal device 16 can be dynamically allocated, given the power budget and the range between the terminal device 16 and the base-station 12, as illustrated in FIGS. 2A–2C. FIGS. 2A–2C are established based upon the following assumptions: 0 dB antenna gain, –70 dBm receiver sensitivity, 10 dB $E_b/N_o$ before detection, 10 dB overall receiver noise figure, and 50 dB transmit power loss after 1 meter radius. It will be understood that the correlation between power budget and range provided in FIGS. 2A–2C is idealized, and that there will be interference effects that require more precise adjustment. This will be described further hereinafter, but FIGS. 2A–2C illustrate that different data rates are possible for the various power levels that exist within each of the U-NII bands, and thus help provide an understanding of the present invention.

This dynamic allocation is simply repeated for communications between the base station and each different terminal device 16. Typically, each base station can support up to tens of different terminal devices, with each terminal device not exceeding the maximum power level for transmissions in either direction.

For purposes of teaching the dynamic allocation of data rate according to the present invention, assume that the power-distance relationship follows a 4-th order roll-off, i.e., the average power requirement is proportional to the 4-th order of the distance between a base-station and a terminal device. A rule-of-thumb calculation based on that assumption indicates that 12 dB more power is required whenever the distance is doubled. Since the average power requirement should be proportional to the data rate in a well-designed system, whenever the distance is halved, the data rate can increase by a factor of 16, assuming the power budget remains the same.

Figure 1D:
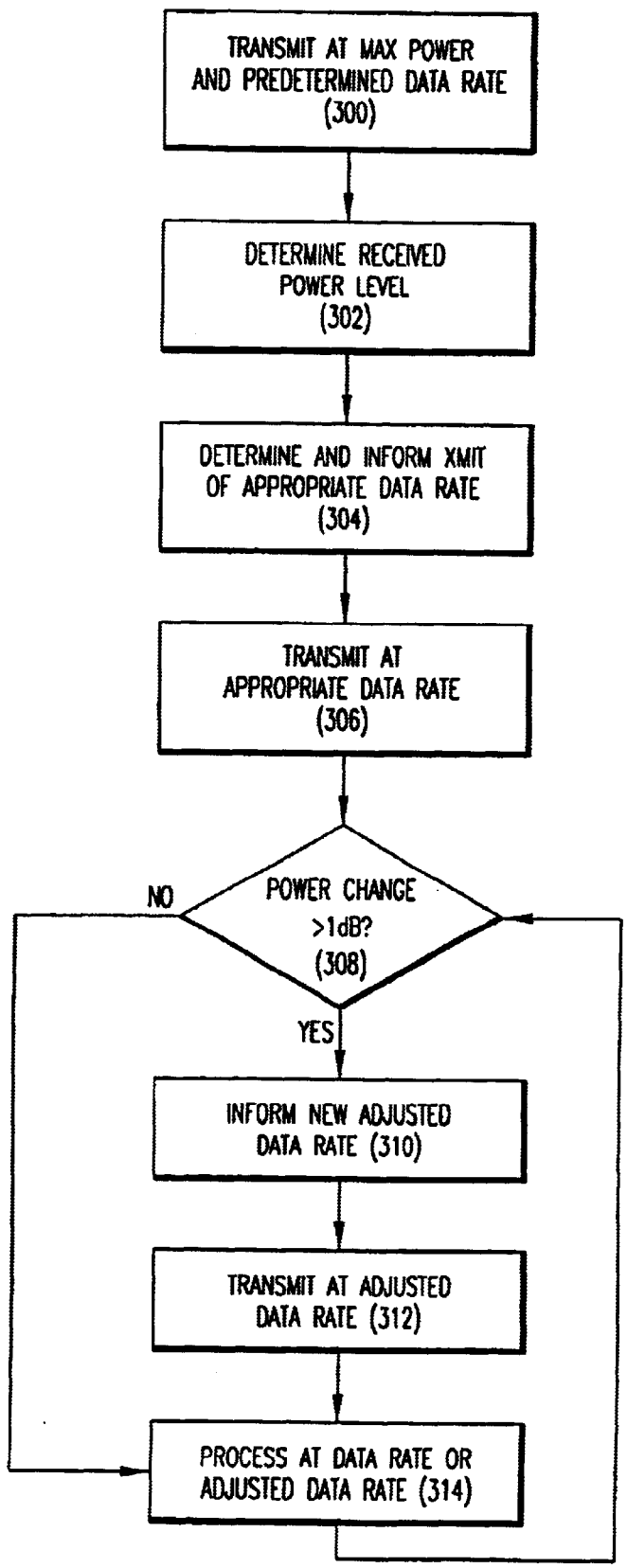

Accordingly, in determining the appropriate data rate from a base station 12 to a specific terminal device 16, the signal processor 102 in the base station will initiate a transmission to the terminal device 16 at the maximum power level that is allowed and predetermined low data rate, as shown in step 300 illustrated in FIG. 1D.

Thereafter, in step 302 the received power level at that low data rate is determined by the signal processor 214 by way of an automatic gain control circuit (AGC), which is needed to determine the appropriate dynamic range for the ADC to function correctly in a receiver. Based on the received power level, the signal processor 214 can determine the appropriate data rate to use for transmission. Signal detection is based on the received signal energy per bit, $E_o$ which is the product of the received power and the interval per bit. If a desired level of $E_o$ has to be maintained to guarantee certain performance requirement, the received power level and the data rate are in direct proportion to each other to maintain a constant $E_o$. Therefore in most well-designed systems, the new data rate can be determined from the received power level. Step 304 follows, in which the signal processor 214 informs the signal processor 102 of the appropriate data rate to use for the next round of communications. Thereafter, based upon the received information the signal processor 102 will then transmit data at that data rate as shown by step 306. If at any time during the transmission the power level changes by more than a certain threshold, such as 1 dB (step 308), the signal processor 214 informs the signal process or 102 of a new data rate, as shown in step 310, and the signal processor 102 adjusts the data rate accordingly, as shown by step 312. Further, the processor 214, having sent the new data rate to the processor 102, will thereafter process subsequently received data corresponding to that new rate, as shown by step 314. This is the closed loop rate control.

Alternatively, rather than sending the new data rate, the signal processor 214 can use the new data rate to send data to the signal processor 102. Because the new data rate is based on the received power level at the processor 214, assuming that the channel is symmetrical, the signal energy per bit received by the signal processor 102 will be sufficient for reliable detection. The uncertainty on the data rate for the signal processor 102 can be resolved by either one of the following two methods. First, the information of the new data rate can be sent at a predetermined low data rate by signal processor 214 and then the signal processor 214 can switch to the new data rate for data transmission, assuming that the bits which carry the information of the new data rate can be timely detected by the signal processor 102. The second method uses a set of predetermined date rates agreed upon by both processors 102 and 214. The signal processor 214 can choose any data rate in this set, and the signal processor 102 can reliably detect the sent data at any rate chosen from this set, as long as the received energy per bit is greater than a certain threshold, which is guaranteed by the signal processor 214. The actual mechanism for detecting data without knowing the exact data rate is within the ability of those skilled in the art. This is the open loop rate control.

Another example of the communications that can be implemented using this embodiment is the usage of the 5.725–5.825 GHz band for downlink transmissions and 5.15–5.25 GHz for uplink transmissions. Since there is more power available for the downlink transmissions, the aggregate downlink capacity can be increased accordingly. This example has the additive advantage in that the synthesizer design in both the terminal device and the base station is easier to implement, as the two bands are more widely separated.

Using the principles outlined above with respect to FIGS. 1A–1D and 2A–2C, there are various different embodiments of the present invention that can also be implemented.

Figure 3:
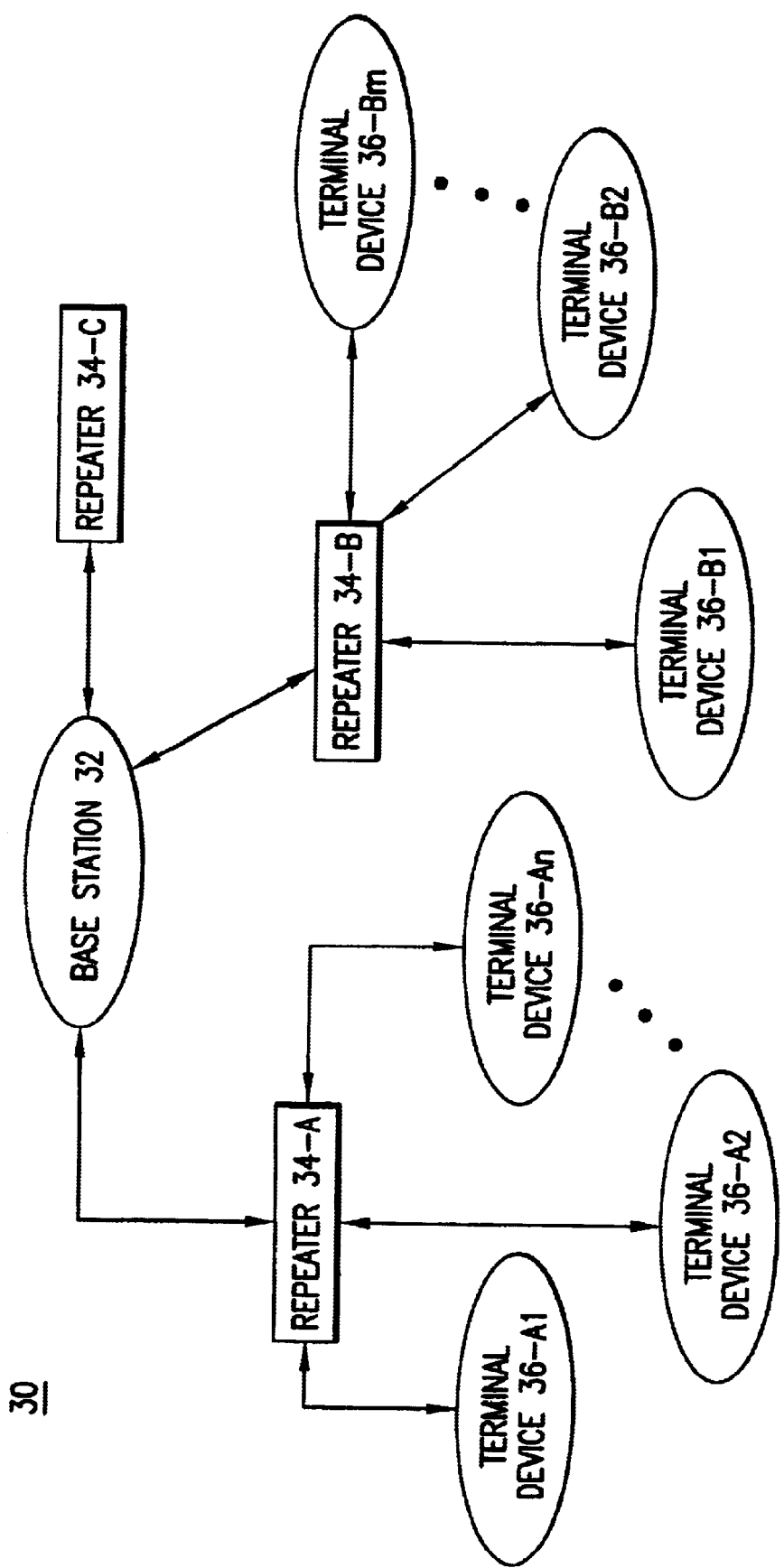
FIG. 3 illustrates one embodiment of the communications system according to the present invention.

As illustrated in FIG. 3, in the system 30 according to one embodiment of the present invention, the 5.725–5.825 Ghz band is used for distribution between base station 32 and repeaters 34 (for both downlink and uplink or for downlink only). Repeaters, as are known, are used to serve as a local distributor of data. Accordingly, there will typically be a number of different repeaters 34 associated with a single base station 32. According to the present invention, having a repeater in different rooms or different buildings is an effective way of communicating data. Similarly, a number of different terminal devices 36 can then be associated with each repeater 34. For communications between terminal devices 36 and one of the repeaters 34, depending on which band is used for the uplink from a repeater to a base-station, the 5.25–5.35 GHz band can used for downlink transmissions, and the 5.15–5.25 GHz band is used for uplink transmissions.

In this embodiment, each repeater or the base-station is considered as a single transceiver. Furthermore, the specific components used to make each base station 32 and terminal device 36 are similar to those described above with reference to the base station 12 and terminal device 16, respectively, of FIG. 1, whereas the components used to make each repeater 34 are similar to that of a terminal device, only that the digital data processing unit can be minimized. One extreme example would be that there is no need for ADC, digital circuit, or DAC in a repeater, as the frequency conversion task, which is composed of received signal amplification, frequency conversion, and transmitted signal amplification, can be performed completely by analog components. Similarly as with the previous embodiment, multiple antennas can be used by each of the base station 32, repeaters 34, or terminal devices 36, in order to achieve spatial diversity, for the purpose of increased capacity and robustness.

In accordance with the principles described above, the actual bandwidth to each terminal device 36 can be varied according to the individual needs and the distance between the repeater 34 and the terminal device 36. In other words, the total resource available for each repeater 34 is 250 mW of transmit power (plus potential 6 dBi of antenna gain) for downlink transmissions. The actual data rate to each terminal device can be dynamically allocated, given the power budget and the range between the terminal device and the repeater. The data rate between the base station 32 and each repeater 34 can be substantially higher than the data rate between a terminal device and a repeater. The reason is that more power budget is allowed in the 5.725–5.825 GHz band, plus a substantial antenna gain, 23 dBi. With both high power and high antenna gain, the system can deliver substantially longer range and higher aggregate data rate between a base station and a repeater.

In contrast to the embodiment illustrated in FIG. 1, the use of repeaters 34 in the embodiment of FIG. 3 allows better control of the transmission range, so that, for example, the data transmitted between a given repeater 34-A and its terminal devices 36A1–36An will not interfere with the data transmitted between another repeater 34-B and its terminal devices 36B1–36Bm.

Figure 4:
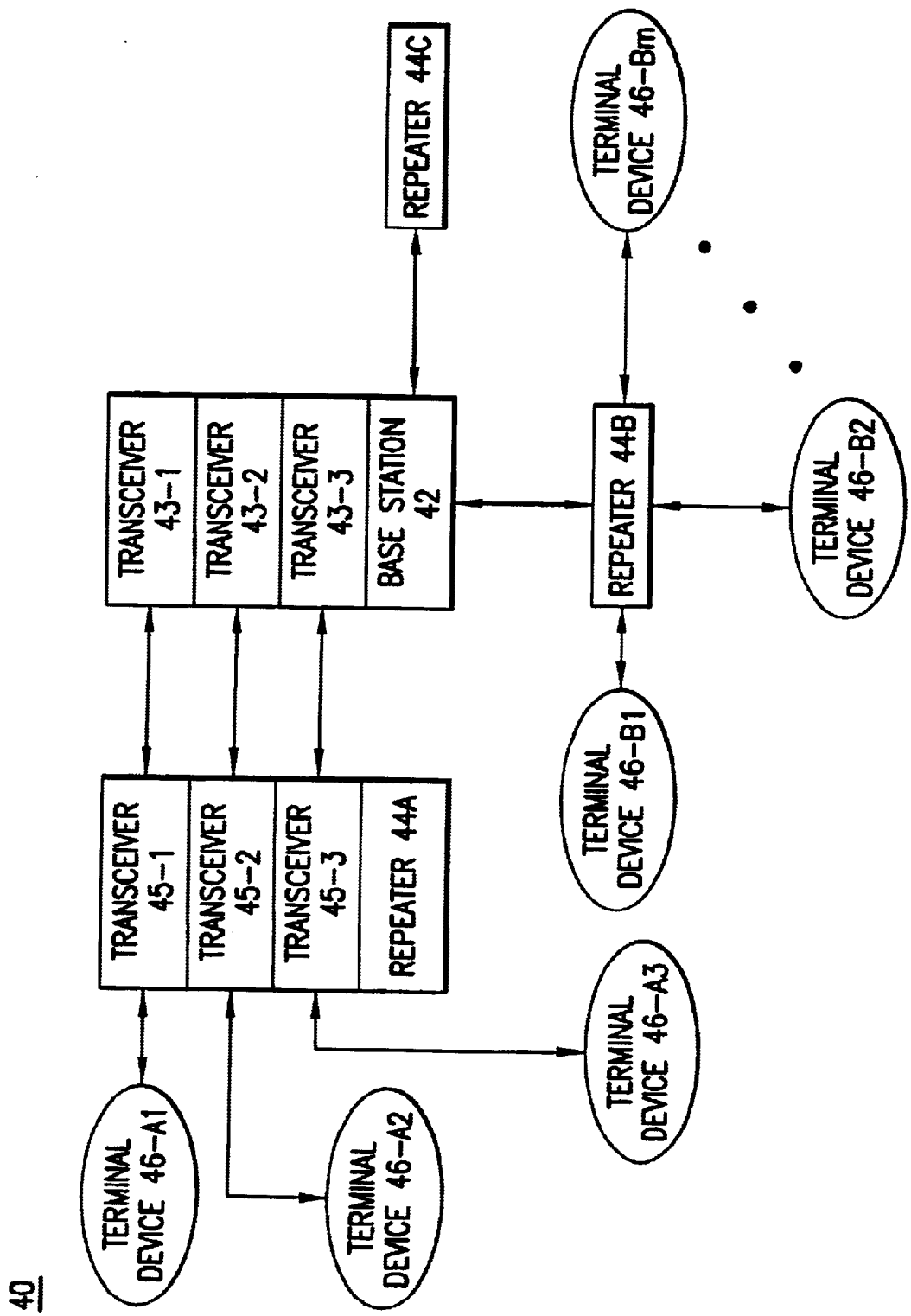
FIG. 4 illustrates another embodiment of the communications system according to the present invention.

As illustrated in FIG. 4, in the system 40 according to one embodiment of the present invention, the 5.725–5.825 Ghz band is used for distribution between base embodiment of FIG. 1 could also be made up a plurality of transceivers, with the same benefits being derived therefrom.

Figure 5:
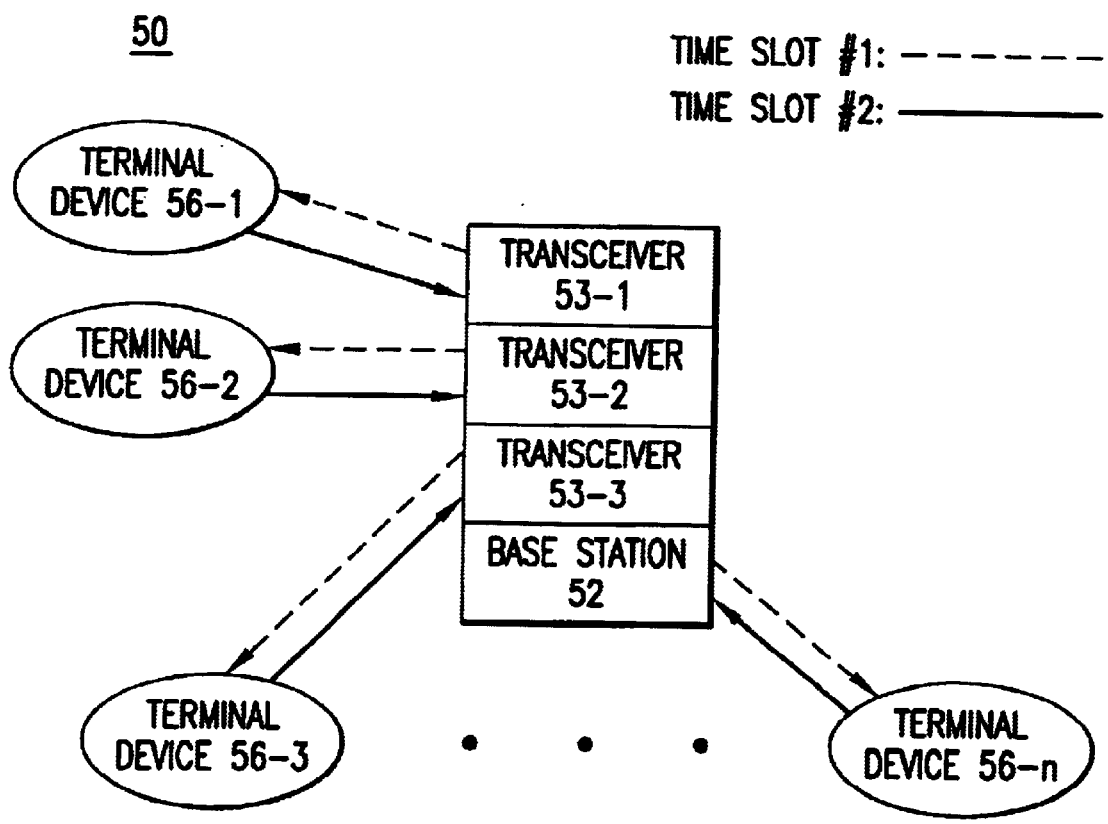
FIG. 5 illustrates another embodiment of the communications system according to the present invention.

As illustrated in FIG. 5, in another embodiment of the present invention, a system 50 provides a base station 52 and a plurality of terminal devices 56, and each band can be used for both uplink and downlink through time division duplex (TDD) between the base station 52 and the terminal devices 56. In this embodiment, the base-station 52 can be constructed as a cluster of transceivers if the aggregate downlink capacity is equal to or larger than the uplink capacity of each individual terminal device 56, as both the terminal devices 56 and base station transceivers have the same transmit power limit.

Figure 6:
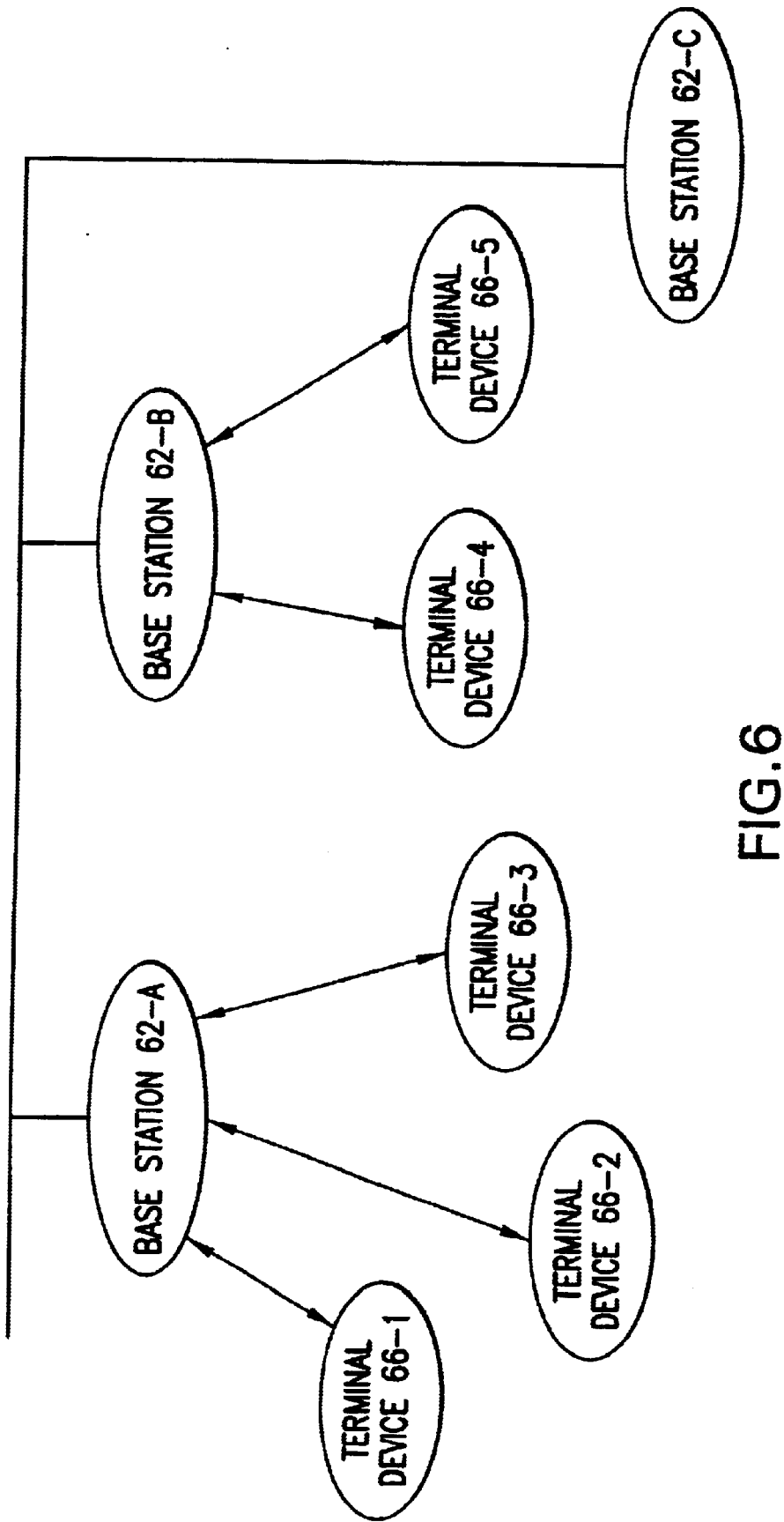
FIG. 6 illustrates another embodiment of the communications system according to the present invention.

As illustrated in FIG. 6, the present invention is also intended for usage with multiple base-stations 62 and multiple terminal devices 66. Each base-station 62 can be considered as a single transceiver or a cluster of transceivers, as has been previously discussed. If each of the base stations 62 are sufficiently apart so that the transmitted signal power in one cluster is lower than the noise floor as received by the devices in other clusters, each base station 62 and its terminal devices 66 can be considered as a stand-alone system, as set forth and described in the above embodiments. If the base stations 62 are placed close enough such that signals intended for one base station and its associated terminal devices can be detected by another base station and its associated terminal devices, the system can still be designed using the above-described principles for both downlink transmissions and uplink transmissions. The individual channel to each terminal device can be created using either conventional code-division multiple access techniques (different codes for different terminal devices) or spatial-division multiple access techniques (use of antenna diversity).

In a further embodiment of the present invention, the principles of the present invention can be implemented on Ad-hoc networks as well. By Ad-hoc network is meant a network in which there is no fixed base station. Each communication link is set up dynamically through a mutually understood protocol, such as the one used by Bluetooth. Once a link is set up, the master, or the head of a cluster, should be considered as a base-station. Accordingly, once the base station is determined, one of the previously described embodiments can be implemented in such an Ad-hoc network. In other words, allowing the master node higher transmit power will accommodate a larger overall capacity for the master to transmit data to its slaves.

While the present invention has been described herein with reference to particular embodiments thereof, a latitude of modification, various changes and substitutions are intended in the foregoing disclosure. For example, the bandwidth management methods in this invention can be applied to any combination of frequency bands, including the two ISM bands previously mentioned. It will also be appreciated that in some instances some features of the invention will be employed without a corresponding use of other features without departing from the spirit and scope of the invention as set forth in the appended claims.

I claim:

1. An apparatus for dynamically allocating a data rate for wireless communication, comprising:
    a first transceiver; and
    a second transceiver,
    the first transceiver including means for transmitting data at a first power level and a first data rate to said second transceiver,
    the second transceiver including:
        second means for receiving the first data;
        second means for sensing a received power level of the received data;
        second means for transmitting second data at a second power level and a second data rate to said first transceiver; and
        second means for determining responsive to comparative processing relative to a predetermined frequency band power budget the second data rate at which to transmit the second data, said second data rate determined based upon the received power level of the received data and being different from the first data rate;
        wherein the second means for determining is repetitively used for transmission of second data packets that each occur subsequent to receipt by the second means for receiving of first data packets that are repetitively transmitted by the first transceiver.

2. An apparatus according to claim 1 wherein the first power level and the first data rate, and the second power level and the second data rate can be adapted to be different for each repetitive transmission.

3. An apparatus according to claim 2 wherein an initial transmission of the first data is transmitted at a predetermined low power level.

4. An apparatus according to claim 1 wherein at least one of the second data packets that is transmitted after a particular one of the first data packets is received by the second means for determining includes a plurality of packets.

5. An apparatus according to claim 4 wherein the particular one of the first data packets is a plurality of packets.

6. An apparatus according to claim 1 wherein the second means for transmitting will transmit at a predetermined low rate a part of each of the second data packets containing the second data rate, and thereafter transmit a remainder of each second data packet at the second data rate.

7. An apparatus for dynamically allocating a data rate for wireless communication, comprising:
    a first transceiver; and
    a second transceiver,
    the first transceiver including means for transmitting data at a first power level and a first data rate to said second transceiver,
    the second transceiver including:
        second means for receiving the first data;
        second means for sensing a received power level of the received data;
        second means for transmitting second data at a second power level and a second data rate to said first transceiver; and second means for determining responsive to comparative processing relative to a predetermined frequency band power budget the second data rate at which to transmit the second data, said second data rate determined based upon the received power level of the received data and being different from the first data rate, the second means for determining being repetitively used for transmission of second data occurring subsequent to receipt of first data transmitted by the first transceiver;

wherein the first transceiver further comprises:
first means for receiving the second data;
first means for sensing the received power level of the received second data; and
first means for determining a modified first data rate at which to transmit further first data, said modified first data rate determined based upon the received power level of the received second data;
first means for transmitting the further first data at the modified first data rate and a modified first power level to the second transceiver, and
the second transceiver further comprises second means for receiving the first data.

8. An apparatus according to claim 7 wherein the first transceiver further comprises:
means for sensing the received power level of the received further second data; and
means for redetermining the modified second data rate if the received power level of the received further second data is changed by a second predetermined amount from the received power level of the received second data.

9. The apparatus according to claim 7 wherein each of the first means for receiving the second data and the second means for receiving the first data include multiple antennas.

10. An apparatus according to claim 7 wherein the modified first data rate is different than the first data rate.

11. An apparatus according to claim 10 wherein the modified first power level is different than the first power level.

12. An apparatus according to claim 7 wherein the first means for determining is repetitively used for transmission of first data packets that each occur subsequent to receipt by the first means for receiving of second data packets.

13. An apparatus according to claim 7 wherein the first power level and the first data rate, and the second power level and the second data rate can be adapted to be different for each repetitive transmission.

14. An apparatus according to claim 13 wherein at least one of the first data packets that is transmitted after a particular one of the second data packets is received by the first means for determining includes a plurality of packets.

15. An apparatus according to claim 14 wherein the particular one of the second data packets is a plurality of packets.

16. An apparatus according to claim 12 wherein the first means for transmitting, will transmit at a predetermined low rate a part of each of the first data packets containing the first data rate, and thereafter transmit a remainder of each first data packet at the first data rate.

17. An apparatus according to claim 12 wherein the first data rate is chosen from one of a plurality of predetermined data rates.

18. An apparatus according to claim 12 wherein the second means for determining is repetitively used for transmission of second data packets that each occur subsequent to receipt by the second means for receiving of first data packets.

19. An apparatus according to claim 7 wherein the first power level and the first data rate, and the second power level and the second data rate can be adapted to be different for each repetitive transmission.

20. An apparatus according to claim 19 wherein at least one of the second data packets that is transmitted after a particular one of the first data packets is received by the second means for determining includes a plurality of packets.

21. An apparatus according to claim 20 wherein the particular one of the second data packets is a plurality of packets.

22. An apparatus according to claim 18 wherein each of the first and the second means for transmitting will transmit at a predetermined low rate a part of each of the respective first and second data packets containing the respective first and second data rates, and thereafter transmit a remainder of each respective first and second data packets at the respective first and second data rates.

23. An apparatus according to claim 18 wherein the first data rate and the second data rate is chosen from one of a plurality of predetermined data rates.

24. An apparatus for wireless communications, comprising:
a first base station transceiver;
a plurality of terminal devices including at least first and second terminal device transceivers; and
a repeater,
the first base station transceiver including means for transmitting data at a first power level and a first data rate to the repeater;
the repeater including:
means for receiving the data;
means for transmitting a first portion of the data to the first terminal device transceiver at a second data rate and a second power level; and
means for transmitting a second portion of the data to the second terminal device transceiver at a third data rate and a third power level,
the first and second terminal device transceivers-each including:
means for sensing the received power level of the received data; and
means for determining a modified data rate different than said respective second and third data rate at which to transmit further data, said modified data rate having a maximum data rate that is determined based upon the received power level of the received data,
wherein the means for transmitting the first portion of the data and the means for transmitting the second portion of the data are each adapted to transmit the further data at the modified data rate to the repeater.

25. An apparatus according to claim 24 wherein the first and second terminal device transceiver further include:
means for sensing the received power level of the received further data; and
means for redetermining the modified data rate if the received power level of the received further data is different by a predetermined amount from the received power level of the received data.

26. An apparatus according to claim 25, wherein the repeater contains a plurality of repeater transceivers such that there exists one repeater transceiver for each of a different plurality of terminal device transceivers; and
wherein the means for receiving the data and the further data for each one repeater transceiver cause that one repeater transceiver to receive that further data corresponding to the associated plurality of terminal device transceivers.

27. An apparatus according to claim 26 wherein each of the means for transmitting the data and the further data transmit from first and second repeater transceivers to respective first and second plurality of terminal device transceivers using the 5.725–5.825 GHz band.

28. An apparatus according to claim 27, wherein the first and second pluralities of terminal device transceivers each include means for transmitting first and second portions of second data at respective fourth and fifth data rates to the respective repeater at respective fourth and fifth power levels using one of the 5.25–5.35 GHz and 5.15–5.25 GHz bands.

29. An apparatus according to claim 28, wherein each of the first and second repeater transceivers each include means for transmitting the second data to the base station transceiver using the 5.725–5.825 GHz band.

30. An apparatus according to claim 24, wherein the means for transmitting the data and the further data transmit from the repeater to the first and second terminal device transceivers using one of the 5.25–5.35 GHz and 5.15–5.25 GHz bands.

31. An apparatus according to claim 30, wherein the first and second terminal device transceivers each include means for transmitting first and second portions of second data to the repeater at respective fourth and fifth power levels using the other one of the 5.25–5.35 GHz and 5.15–5.25 GHz bands.

32. An apparatus according to claim 31, wherein the repeater further includes means for transmitting the second data to the base station transceiver at a sixth power level using the 5.725–5.825 GHz band.

33. An apparatus according to claim 31, wherein the first power level is greater than the second power level.

34. An apparatus according to claim 24 wherein there is included a plurality of repeaters and a second plurality of terminal device transceivers, such that one repeater and corresponding terminal devices are in one room and another repeater and corresponding terminal devices are in another room.

35. An apparatus according to claim 24, wherein there is included a plurality of repeaters and a second plurality of terminal device transceivers, such that one repeater and corresponding terminal devices are in one building and another repeater and corresponding terminal devices are in another building.

36. The apparatus according to claim 24 wherein each of the first base station transceiver, the plurality of terminal devices, and the repeater include multiple antennas.

37. An apparatus according to claim 24 wherein the first base station transceiver includes means for transmitting the data within the 5.725–5.825 GHz band.

38. A method of dynamically allocating a data rate for wireless communication between a first transceiver and a second transceiver comprising the steps of:
transmitting data at a first power level and a first data rate from a first transceiver to a second transceiver;
receiving the data at the second transceiver;
sensing the received power level of the received data;
determining responsive to comparative processing relative to a predetermined frequency band power budget a second data rate different from the first data rate at which to transmit other data, said second data rate determined based upon the received power level of the received data;
transmitting the other data at the second data rate and a second power level, from the second transceiver to the first transceiver, the step of determining the second data rate being repetitively used for transmission of the other data occurring subsequent to receipt of data transmitted by the first transceiver; and further including the steps of:
receiving the other data at the first transceiver;
sensing the received power level of the received other data;
determining a modified first data rate from the received power level of the received further data; and
transmitting further data from the first transceiver to the second transceiver at the modified first data rate.

39. A method according to claim 38 further comprising the steps of:
sensing the received power level of the received further data;
determining a modified second data rate from the received power level of the received further data; and
transmitting further other data from the second transceiver to the first transceiver at the modified second data rate.

40. A method according to claim 39, wherein the steps of transmitting the data and the further data transmits within the 5.725–5.825 GHz band and the steps of transmitting the other data and the further other data transmits within one of the 5.25–5.35 GHz and 5.15–5.25 GHz bands.

41. A method according to claim 39, wherein the steps of transmitting the data and the further data transmits within the 5.725–5.925 GHz hand and the steps of transmitting the other data and the further other data transmits within both of the 5.25–5.35 GHz and 5.15–5.25GHz bands.

42. A method according to claim 39, wherein the first power level is greater than the second power level.

43. A method according to claim 35 wherein the modified first data rate is different than the first data rate.

44. A method according to claim 43 wherein the modified first power level is different than the first power level.

45. A method according to claim 35 wherein the steps of sensing the received power level of the received other data and determining the modified first data rate are performed by the first transceiver.

46. A method according to claim 35 wherein the steps of sensing the received power level of the received other data, determining the modified first data rate, and transmitting the further data arc repeated repetitively to cause transmission of first data packets that each occur subsequent to receipt of second data packets during repeated steps of receiving the other data at the first transceiver.

47. A method according to claim 46 wherein the first power level and the first data rate, and the second power level and the second data rate can be adapted to be different for each repetitive transmission.

48. A method according to claim 47 wherein at least one of the first data packets that is transmitted after a particular one of the second data packets is received includes a plurality of packets.

49. A method according to claim 48 wherein the particular one of the second data packets is a plurality of packets.

50. A method according to claim 46 wherein the step of transmitting the further data will transmit at a predetermined low rate a part of each of the first data packets containing the first data rate, and thereafter transmit a remainder of each first data packet at the first data rate.

51. A method according to claim 46 wherein the step of transmitting the further data will transmit at the first data rate that is chosen from one of a plurality of predetermined data rates.

52. A method according to claim 46 wherein the steps of sensing the received power level of the received data, determining the second data rate, and transmitting the other data are repeated repetitively to cause transmission of second data packets that each occur subsequent to receipt of first data packets during repeated steps of receiving the data at the second transceiver.

53. A method according to claim 52 wherein the first power level and the first data rate, and the second power level and the second data rate can be adapted to be different for each repetitive transmission.

54. A method according to claim 53 wherein at least one of the second data packets that is transmitted after a particular one of the first data packets is received includes a plurality of packets.

55. A method according to claim 54 wherein the particular one of the second data packets is a plurality of packets.

56. A method according to claim 52 wherein the steps of transmitting the data and the other data will respectively transmit at a predetermined low rate a part of each to the first and second data packets containing the respective first and second data rates, and thereafter transmit a remainder of each first and second data packets at the respective first and second data rate.

57. A method according to claim 52 wherein the steps of transmitting the data and the other data will respectively transmit at the first and second data rates that are each chosen from one of a plurality of predetermined data rates.

58. A method according to claim 39 wherein the steps of sensing the received power level of the received further data and determining the modified second data rate are performed by the second transceiver.

59. A method of dynamically allocating a data rate for wireless communication between a first transceiver and a second transceiver comprising the steps of:

transmitting data at a first power level and a first data rate from a first transceiver to a second transceiver;

receiving the data at the second transceiver;

sensing the received power level of the received data;

determining responsive to comparative processing relative to a predetermined frequency band power budget a second data rate different from the first data rate at which to transmit other data, said second data rate determined based upon the received power level of the received data, and wherein said step of determining occurs without the occurrence of a specific request for a data rate change;

transmitting the other data at the second data rate and a second power level, from the second transceiver to the first transceiver, the step of determining the second data rate being repetitively used for transmission of the other data occurring subsequent to receipt of data transmitted by the first transceiver; and further including the step of:

receiving the other data at the first transceiver;

sensing the received power level of the received other data;

determining a modified first data rate from the received power level of the received other data; and transmitting further data from the first transceiver to the second transceiver at the modified first data rate.

60. A method according to claim 59 further comprising the steps of:

sensing the received power level of the received further data;

determining a modified second data rate from the received power level of the received further data; and transmitting further other data from the second transceiver to the first transceiver at the modified second data rate.

61. A method according to claim 60, wherein the steps of transmitting the data and the further data transits within the 5.725–5.825 GHz band and the steps of transmitting the other data and the further other data transmits within one of the 5.25–5.35 GHz and 5.15–5.25 GHz bands.

62. A method according to claim 60, wherein the steps of transmitting the data and the further data transmits within the 5.725–5.825 GHz band and the steps of transmitting the other data and the further other data transmits within both of the 5.25–5.35 GHz and 5.15–5.25 GHz bands.

63. A method according to claim 60, wherein the first power level is greater than the second power level.

64. A method according to claim 51 wherein the modified first data rate is different than the first data rate.

65. A method according to claim 64 wherein the modified first power level is different than the first power level.

66. A method according to claim 51 wherein the steps of sensing the received power level of the received other data and determining the modified first data rate are performed by the first transceiver.

67. A method according to claim 51 wherein the steps of sensing the received power level of the received other data, determining the modified first data rate, and transmitting the further data are repeated repetitively to cause transmission of first data packets that each occur subsequent to receipt of second data packets during repeated steps of receiving the other data at the first transceiver.

68. A method according to claim 67 wherein the first power level and the first data rate, and the second power level and the second data rate can be adapted to be different for each repetitive transmission.

69. A method according to claim 68 wherein at least one of the first data packets that is transmitted after a particular one of the second data packets is received includes a plurality of packets.

70. A method according to claim 69 wherein the particular one of the second data packets is a plurality of packets.

71. A method according to claim 67 wherein the step of transmitting the further data will transmit at a predetermined low rate a part of each of the first data packets containing the first data rate, and thereafter transmit a remainder of each first data packet at the first data rate.

72. A method according to claim 67 wherein the step of transmitting the further data will transmit at the first data rate that is chosen from one of a plurality of predetermined data rates.

73. A method according to claim 67 wherein the steps of sensing the received power level of the received data, determining the second data rate, and transmitting the other data are repeated repetitively to cause transmission of second data packets that each occur subsequent to receipt of first data packets during repeated steps of receiving the data at the second transceiver.

74. A method according to claim 73 wherein the first power level and the first data rate, and the second power level and the second data rate can be adapted to be different for each repetitive transmission.

75. A method according to claim 74 wherein at least one of the second data packets that is transmitted after a particular one of the first data packets is received includes a plurality of packets.

76. A method according to claim 75 wherein the particular one of the second data packets is a plurality of packets.

77. A method according to claim 73 wherein the steps of transmitting the data and the other data will respectively transmit at a predetermined low rate a part of each of the first and second data packets containing the respective first and second data rates, and thereafter transmit a remainder of each first and second data packets at the respective first and second data rate.

78. A method according to claim 73 wherein the steps of transmitting the data and the other data will respectively transmit at the first and second data rates that are each chosen from one of a plurality of predetermined data rates.

79. A method according to claim 60 wherein the steps of sensing the received power level of the received further data and determining the modified second data rate are performed by the second transceiver.

80. A method of dynamically allocating a data rate for wireless communication between a first transceiver and a second transceiver comprising the steps of:

transmitting data at a first power level and a first data rate from a first transceiver to a second transceiver;

receiving the data at the second transceiver;

sensing the received power level of the received data;

determining responsive to comparative processing relative to a predetermined frequency band power budget a second data rate different from the first data rate at which to transmit other data, said second data rate determined based upon the received power level of the received data; and transmitting the other data at the second data rate and a second power level, from the second transceiver to the first transceiver; and further including the steps of:
receiving the other data at the first transceiver;
wherein the steps of sensing the received power level of the received data, determining the second data rate, and transmitting the other data are repeated repetitively to cause transmission of second data packets that each occur subsequent to receipt of first data packets during repeated steps of receiving the data at the second transceiver.

81. A method according to claim 80 wherein an initial transmission of the first data is transmitted at a predetermined low power level.

82. A method according to claim 81 wherein an initial transmission of the first data is transmitted at a predetermined low power level.

83. A method according to claim 80 wherein at least one of the second data packets that is transmitted after a particular one of the first data packets is received by the second means for determining includes a plurality of packets.

84. A method according to claim 83 wherein the particular one of the first data packets is a plurality of packets.

85. A method according to claim 80 wherein the step of transmitting the other data will transmit at a predetermined low rate a part of each of the second data packets containing the second data rate, and thereafter transmit a remainder of each second data packet at the second data rate.

86. A method of dynamically allocating a data rate for wireless communication between a first transceiver and a second transceiver comprising the steps of:

transmitting data at a first power level and a first data rate from a first transceiver to a second transceiver;

receiving the data at the second transceiver;

sensing the received power level of the received data;

determining responsive to comparative processing relative to a predetermined frequency band power budget a second data rate different from the first data rate at which to transmit other data, said second data rate determined based upon the received power level of the received data, and wherein said step of determining occurs without the occurrence of a specific request for a data rate change;

transmitting the other data at the second data rate and a second power level, from the second transceiver to the first transceiver; and further including the step of:
receiving the other data at the first transceiver;
wherein the steps of sensing the received power level of the received data, determining the second data rate, and transmitting the other data are repeated repetitively to cause transmission of second data packets that each occur subsequent to receipt of first data packets during repeated steps of receiving the data at the second transceiver.

87. A method according to claim 86 wherein the first power level and the first data rate, and the second power level and the second data rate can be adapted to be different for each repetitive transmission.

88. A method according to claim 87 wherein an initial transmission of the first data is transmitted at a predetermined low power level.

89. A method according to claim 86 wherein at least one of the second data packets that is transmitted after a particular one of the first data packets is received by the second means for determining includes a plurality of packets.

90. A method according to claim 89 wherein the particular one of the first data packets is a plurality of packets.

91. A method according to claim 86, wherein the step of transmitting the other data will transmit at a predetermined low rate a part of each of the second data packets containing the second data rate, and thereafter transmit a remainder of each second data packet at the second data rate.

92. A method according to claim 86 wherein the step of transmitting the other data will transmit at the second data rate that is chosen from one of a plurality of predetermined data rates.

* * * * *